May 20, 1969 — H. E. STULLER — 3,444,750
ADJUSTOR MECHANISM

Filed Oct. 18, 1967 — Sheet 1 of 2

INVENTOR
HOWARD E. STULLER
BY Kenneth C. Witt
ATTORNEY

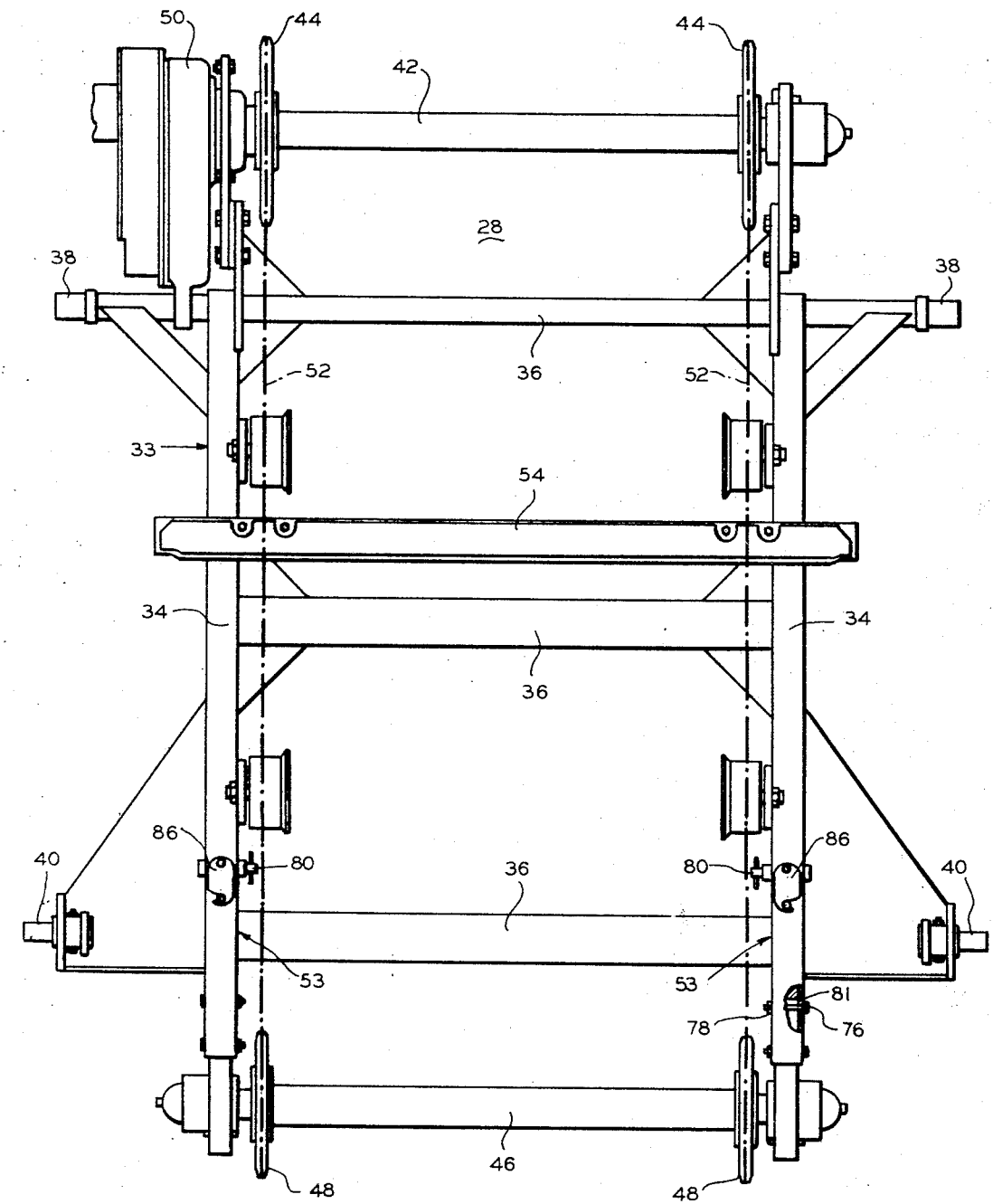

United States Patent Office 3,444,750
Patented May 20, 1969

3,444,750
ADJUSTOR MECHANISM
Howard E. Stulier, Lubbock, Tex., assignor to Clark Equipment Company, a corporation of Michigan
Filed Oct. 18, 1967, Ser. No. 676,300
Int. Cl. F16h 7/10; F15b 15/26
U.S. Cl. 74—242.14   2 Claims

ABSTRACT OF THE DISCLOSURE

An adjustor mechanism for an endless chain or belt mechanism having a hollow frame member housing a tubular member, a movable ram in the tubular member, an expandible chamber which upon expansion extends the ram, and means for introducing fluid under pressure into the chamber to extend the ram and push a slidable member outwardly of the hollow frame member.

Background of the invention

It is important to be able to adjust the tension on various endless chain and endless belt mechanisms in order to compensate for wear and provide optimum operating conditions. The invention as disclosed herein is applied to the endless elevator mechanism of an elevating scraper, but it will be readily appreciated that it is applicable also to endless belt conveyors, the track mechanisms of endless track vehicles and in a wide variety of other similar applications.

It is desirable that the adjustment of such mechanisms be as simple and as low cost as possible, and further that it be possible to make the adjustment simply and quickly, and it is the object of the present invention to provide such an adjustor mechanism.

Summary of the invention

In carrying out this invention in one form thereof I provide an adjustor mechanism which includes an elongated tubular member which has a closure across it and a movable ram projecting from one end and forming with the closure a variable volume chamber in the tubular member. Means are provided for introducing fluid under pressure into the chamber to extend the ram. The elongated tubular member is secured within a hollow frame member and the ram abuts against another frame member which projects out the end of the hollow frame member and is slidable so that when the ram extends it slides the last-named frame member outwardly of the hollow frame member.

Brief description of the drawing

FIGURE 2 is a view along the line 2—2 of FIG. 1 of the frame and other parts of the elevator mechanism;

FIGURE 3 is a perspective view of one of the two adjustor mechanisms with a portion of the frame broken away to show the internal parts; while

Description of the preferred embodiment

Figure 1:
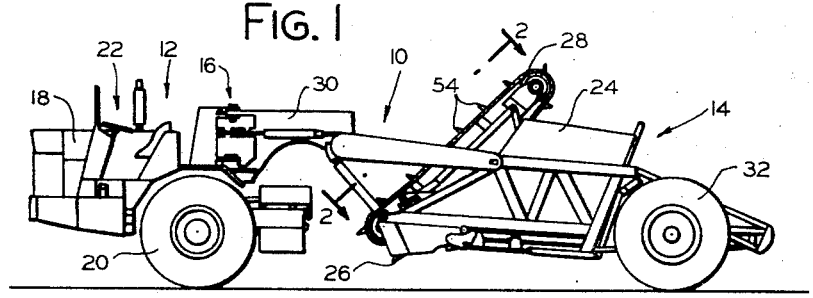
FIGURE 1 is a side elevational view of an elevating scraper embodying the adjustor mechanism of the present invention in a preferred from thereof.

The numeral 10 in FIG. 1 designates generally a tractor elevating scraper which is illustrated in the form of an articulated vehicle comprising a two-wheel tractor portion 12 and a two-wheel trailer portion 14 connected by a combined steering and draft coupling indicated by the numeral 16. The tractor portion 12 includes an engine or other prime mover (not visible) within enclosure 18, a pair of wheels 20 (only one of which is visible) which are driven by the engine to propel the vehicle, and an operator's station 22.

This vehicle is for loading, transporting and unloading earth and other material, and the trailer portion 14 includes a main bowl or box portion 24 having a cutting edge 26 at the lower front, and an endless chain elevator 28 for moving material upwardly and rearwardly into the box portion. The elevator 28 is operated counterclockwise as viewed in FIG. 1. It should be understood that the trailer portion 14 is shown in the carrying position and hence the cutting edge 26 is considerably above ground level. During loading operation the cutting edge 26 is lowered to cut into the ground. Other parts of the trailer portion 14 include a yoke 30 for connecting the trailer portion to the tractor portion, and a pair of rubber-tired wheels 32 (only one of which is visible) mounted at the outer ends of the rear axle.

FIG. 2 of the drawing shows a plan view of the elevator mechanism 28 with some parts omitted or shown schematically in order to show more clearly the parts essential to an understanding of the present invention. The elevator mechanism includes a pair of elongated frame members 34 and suitable cross members 36 to provide a rigid frame of the elevator. This frame is pivotally connected to the box portion of the trailer by means of links (not shown in FIG. 2) which are pivotally connected at upper trunnion portions 38 and lower trunnion portions 40. The elevator 28 includes an upper shaft 42 with a pair of sprockets 44 mounted thereon, and a lower shaft 46 with a pair of sprockets 48 mounted thereon. The upper shaft 42 is operated in this particular instance by a hydraulic motor through a gear box 50. This turns the sprockets 44 and moves endless chains 52 which are indicated schematically by centerlines. Mounted on the chains 52 are a plurality of flights or slats 54 (only one of which is shown in FIG. 2), and these flights move the dirt away from the cutting edge and upwardly and rearwardly into the box of the vehicle.

Figure 3:
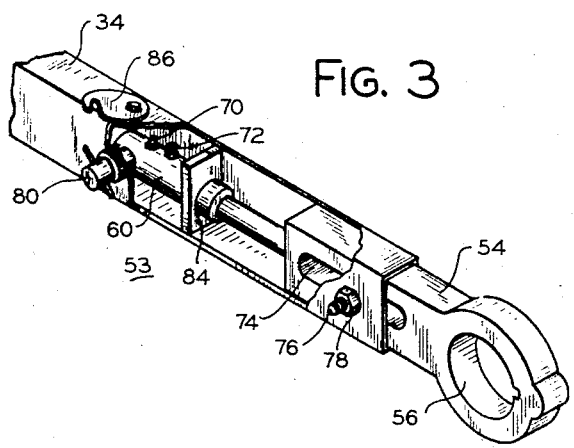
Figure 4:
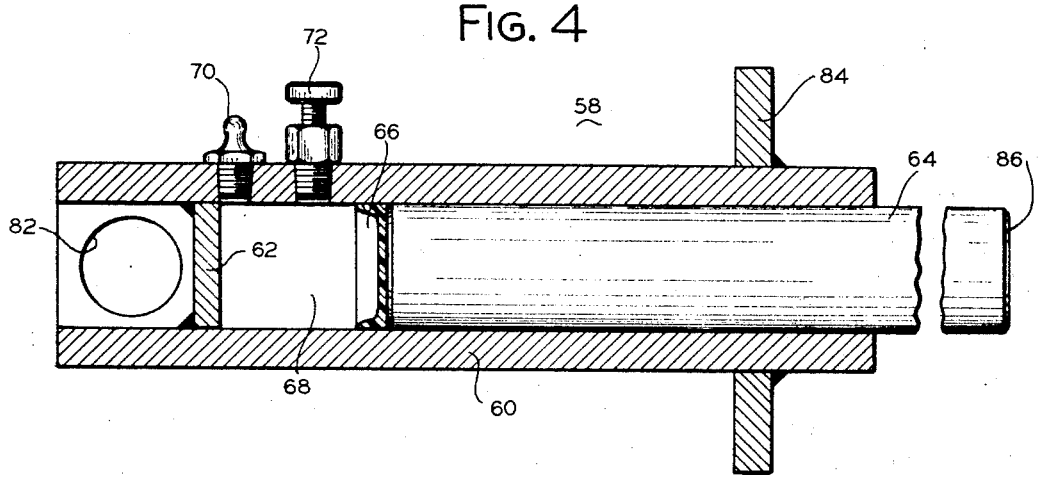
FIGURE 4 is a cross-sectional view of the inner portion of the adjustor mechanism.

To adjust the tension on the chains 52 adjustor mechanisms 53 are provided at the lower ends of the frame members 34, and FIGS. 3 and 4 illustrate in greater detail the adjustor mechanism at the lower end of the right frame member of FIG. 2. The adjustor mechanism at the lower end of the left frame member 34 is allochirally related to that on the right frame member.

As seen in FIG. 3 frame member 34 is rectangular in cross-section and is hollow, and at the lower end has another frame member 54 which is slidable in and out of frame member 34; member 54 includes a circular opening 56 in which the bearing mechanism for the end of shaft 46 is supported.

Inside of frame member 34 is the device illustrated in FIG. 4 and designated generally by the numeral 53. Device 53 includes an elongated tubular member 60 which as illustrated is cylindrical. Tube 60 is closed by means of a closure member 62 which is welded or otherwise secured to the inner surface of the cylinder. Slidable within cylinder 60 but projecting from the end thereof is a ram 64, while a seal 66 of rubber, leather or other suitable material is provided to prevent leakage of fluid between cylinder 60 and ram 64. Ram 64 forms with cylinder 60 and closure 62 a variable volume chamber 68. To extend ram 64 fluid is forced into chamber 68 under pressure, for example, grease may be used and it may be introduced through a conventional fitting 70 which is shown as a fitting of the Zerk type. A separate screw device 72 is provided to relieve the pressure in chamber 68 in the event that this is desirable because an attempt to unscrew fitting 70 while chamber 68 was under pressure could result in fitting 70 being ejected with considerable force.

As shown in FIG. 3 slidable frame member 54 is provided with an elongated slot 74. Hollow frame member 34 is provided with two pairs of holes on opposite sides which are in alignment with slot 74, and bolts 76 and nuts 78 thereon are provided to clamp frame members 34 and 54 rigidly together to prevent movement therebetween. This is accomplished by relatively large openings in the outer surface of frame member 34 within which are located washer members 81, as may be seen in FIG. 2. Washers 81 bear directly on inner member 54, therefore, when nuts 78 are tightened on bolts 76 the member 54 is tightened forcibly against the inner surface of frame member 34 to prevent relative movement between the two. It will be understood that the operation just described takes place after the chain adjustment has been made to relieve the device 58 of the necessity of withstanding the pressure and shocks of operation of the elevator mechanism.

Device 53 is constructed and arranged so that it may be merely slipped longitudinally within the frame member 34 and secured in that position by means of a pin 80 which extends through the sides of the frame member 34 and through an opening 82 (see FIG. 4) in the device 53. The device 53 also is provided with a rectangular spacer member 84 welded or otherwise suitably secured thereto which, while it slips readily inside the hollow frame member 34 prevents substantial lateral movement of the device 58. The end 86 of ram 64 abuts against the inner end of frame member 54 in the form of the invention shown, but is not secured thereto. Thus after the device 53 has been extended to extend frame member 54 and the nuts and bolts 76 and 78 are tightened the device 72 can be operated if desired to relieve the pressure in chamber 68 and thus remove entirely any transmittal of shock or stress to the adjustment device 53.

There are two of the devices 53 and each is housed within one of the frame members 34, and access to the fittings 70 and 72 through which fluid is inserted and released respectively is obtained by means of covers 86 over openings in the tops of the frame members 34 which covers can be moved aside to provide access to fittings 70 and 72.

In the operation of this adjustor mechanism, assuming the elevator mechanism is in the condition illustrated in FIG. 2, with the nuts and bolts 76, 78 tightened, the said nuts and bolts on the side of the elevator to be adjusted are first loosened. Then cover 86 on that side of the elevator mechanism is moved aside and grease or other fluid is inserted through fittings 70 into chamber 68 to extend ram 64 which in turn extends frame member 54 and tightens the chain on that side of the elevator. When the chain has been tightened sufficiently, nuts and bolts 76, 78 are tightened again. The chain on the other side of the elevator device can be adjusted in the same manner if required.

If it is desired to loosen the chains to take them off or for any other reason, the nuts and bolts 76, 78 are first loosened and then the cover 86 is moved and fitting 72 is operated to release fluid pressure from chamber 68 to the extent necessary to enable the frame member 54 and ram 64 to be pushed inwardly as far as is required.

While I have described and illustrated my invention in a preferred form in accordance with the statute, it will be readily understood that it is applicable to other devices than the scraper elevator mechanism described and illustrated herein. As mentioned previously it is applicable also to belt conveyors, endless tracks for crawler vehicles and in other equivalent applications, and reference in the claims to endless chains or belts should be understood as covering all such equivalents thereof. Also, it should be understood that the invention is not limited to a cylindrical elongated tubular member 60 but that a tubular member of other than circular cross-section could be used if desired, and the term "tubular" in the claims is not to be considered to be limited to circular in cross-section.

Modifications may be made in my invention, and it should be understood that I intend to cover by the appended claims all such modifications which fall within the true spirit and scope of my invention.

I claim:
1. An adjustor mechanism comprising an elongated tubular member, a closure across the said tubular member, a movable ram in the said tubular member, said ram projecting from one end of the said tubular member and forming with the said closure a variable volume chamber in the tubular member, means for introducing fluid under pressure into the said chamber to extend the said ram, separate means for releasing fluid from the said chamber to allow the retraction of the said ram, an elongated hollow frame member adapted to house the said elongated tubular member, means for detachably securing the said tubular member within the said hollow frame member with the said ram located adjacent one end of said hollow frame member, the said hollow frame member having a flat surface therewithin, a slidable frame member projecting out the said one end of the said hollow frame member and slidable therein, the said slidable frame member having a flat surface abutting the said first-mentioned flat surface, the outer end of the said slidable frame member having a circular opening therein for supporting a bearing mechanism, the said ram engaging the said slidable frame member and sliding it outwardly of the said hollow frame member when the said ram is extended, and means for releasably securing the said slidable frame member rigidly to the said hollow frame member whereby to prevent the transmission of forces acting on the said slidable frame member to the said ram and the said fluid.

2. An adjustor mechanism as specified in claim 1 in which the said means for releasably securing together the said hollow frame member and the said slidable frame member comprises aligned openings in the sides of the said hollow frame member, one opening in the said flat portion thereof and the other opening larger than the first-mentioned opening, a slot in the said slidable frame member, a bolt extending through the smaller of the said openings and through the said slot, and a nut thereon, the larger of the said openings allowing the said nut when it is tightened to apply force on the said slidable frame member to hold the said two flat surfaces rigidly in engagement.

References Cited
UNITED STATES PATENTS

| | | | |
|---|---|---|---|
| 1,663,344 | 3/1928 | Lennard | 74—242.14 XR |
| 1,687,366 | 10/1928 | Doolittle et al. | 92—15 |
| 2,401,670 | 6/1946 | Spetz | 74—242.14 XR |
| 2,665,712 | 1/1954 | Pratt | 92—15 XR |
| 3,082,043 | 3/1963 | Orton | 74—242.14 XR |

FRED C. MATTERN, JR., *Primary Examiner.*

JAMES A. WONG, *Assistant Examiner.*

U.S. Cl. X.R.

92—15